Dec. 13, 1960   M. O. LONGSTRETH ET AL   2,963,741
ADJUSTABLE EXTRUSION DIE
Filed Jan. 26, 1956   2 Sheets-Sheet 2
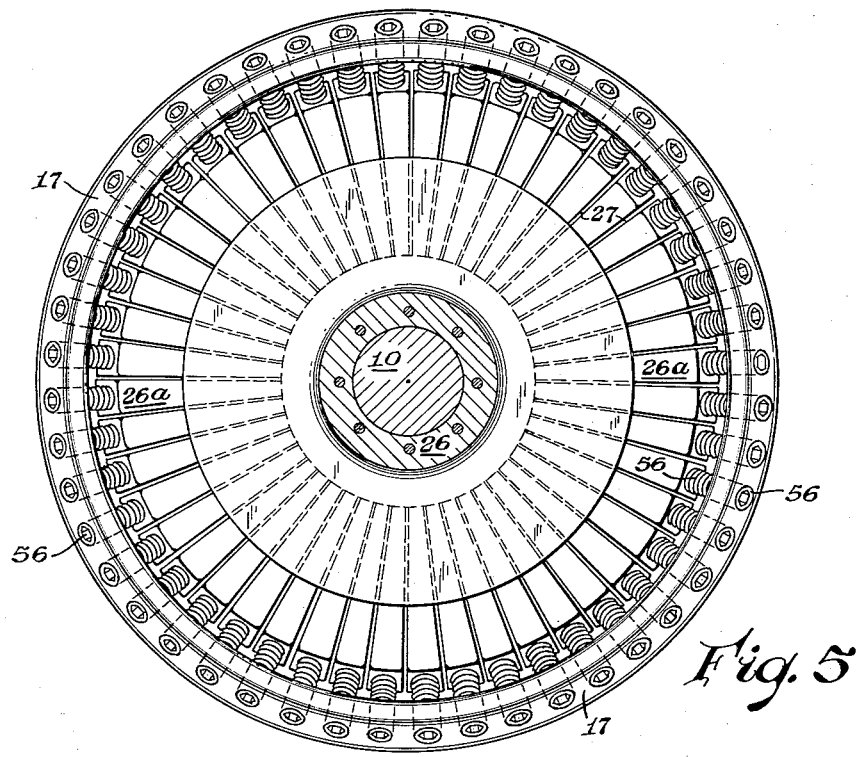
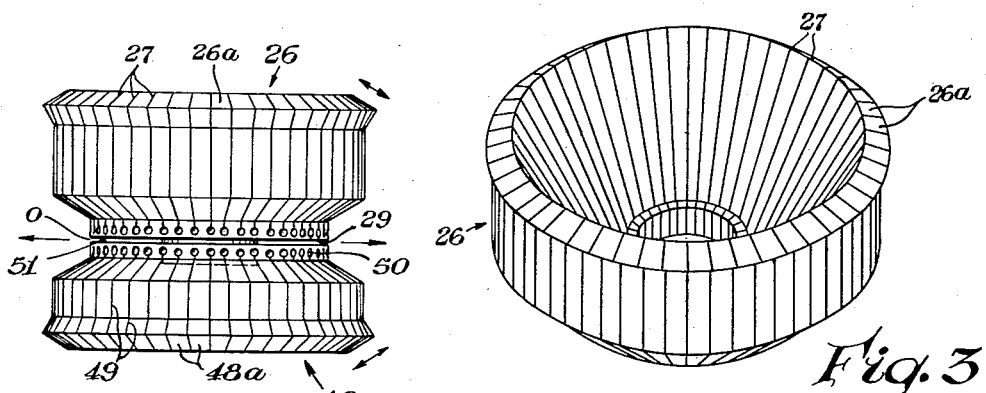
INVENTORS.
Murrey O. Longstreth
James E. Tollar
BY
Griswold & Burdick
ATTORNEYS

United States Patent Office 2,963,741
Patented Dec. 13, 1960

2,963,741

ADJUSTABLE EXTRUSION DIE

Murrey O. Longstreth and James E. Tollar, Midland, Mich., assignors to The Dow Chemical Company, Midland, Mich., a corporation of Delaware Filed Jan. 26, 1956, Ser. No. 561,475

8 Claims. (Cl. 18—14)

This invention relates to an improved shaping orifice or extrusion die which is readily accommodative of effective and precise adjustment. In particular, it relates to an improved adjustable extrusion die for use with organic, thermoplastic, film-forming materials. More particularly, this invention relates to such a die which advantageously may be embodied in a radial form in which it is particularly adapted for discoplanate extrusion wherein the organic, thermoplastic, film-forming material is omniradially extruded in a discoid plane about a center.

It would be advantageous for a shaping or extrusion die for films and like flat shaped structures to be available in a form characterized by superior and rigorous adjustability for obtaining and maintaining desired die clearance settings. It would be particularly advantageous and highly desirable if such features could readily and convenient ly be incorporated in a radial extrusion die having a flat, ring-like, monoplanar orifice which would be adapted to extrude plastic material in a plane radially in all directions about a center, analogous to the radial extrusion die which has been disclosed by the present applicants in their copending application having Serial No. 492,439, now U.S. Patent No. 2,769,200 which was filed on March 7, 1955. The accomplishment of these results and the attainment of other associtaed desiderata is among the principal objects of the present invention.

According to the invention, an adjustable shaping orifice or extrusion die is comprised of a spaced pair of relatively wide and elongate land-providing die lips which are flatly disposed and positioned with a clearance relative to one another to form a slit-like shaping orifice, at least one of said die lips being flexible and transversely bendable in a direction substantially perpendicular to said slit-like orifice; a plurality of adjacent, lever-like adjusting arms, integral with said flexible die lip and projecting at an angle from said flexible lip; each of said arms adapted to being moved to bend the portion of the flexible lip from which the arm projects; means for independently positioning each of said projecting adjusting arms; and associated means for directing a flow of thermoplastic material for extrusion between said die lips.

Beneficially, both of the lips in an extrusion die according to the present invention may be flexible and adjustable. Advantageously, as indicated, the die may be embodied as a radial extrusion die in which the land-providing and orifice-forming die lips are circularly disposed and adapted for discoplanate extrusion and each orbiculated flexible die lip is provided with a circumferential projecting flange which is suitably fissured to provide the plurality of adjacent adjusting arms.

It is ordinarily desirable to mount a radial embodiment of the die in relatively vertical disposition so that it may be supplied with the flowing plastic material from below or above the die and to discharge or extrude the plastic material from the die in the form of a horizontally extending, discoid sheet which is radially extruded omnidirectionally about the vertical axis. In such radial form an adjustable extrusion die in accordance with the present invention may be propitiously utilized in association with a concentric polygonal film stretcher such as is disclosed in the copending application of Murrey O. Longstreth and Turner Alfrey, Jr., Serial No. 493,178, now U.S. Patent No. 2,779,053, filed March 9, 1955.

Further features and advantages of the present invention will be apparent in the following description and specification in connection with the accompanying drawing, in which like reference numerals refer to like parts, wherein;

Figure 1 is an elevation, partly cut away and partly in section, of an embodiment of an extrusion die in accordance with the present invention;

Figure 2 perspectively and schematically illustrates the adjustable, orifice-forming die members of the present invention;

Figure 3 is a perspective representation of the upper die member of the embodiment of the radial die depicted in Figure 1;

Figure 4 is an elevation of the die members of Figure 1; and

Figure 5 is a sectional view taken along 5—5 in Figure 1.

Figures 1, 2:
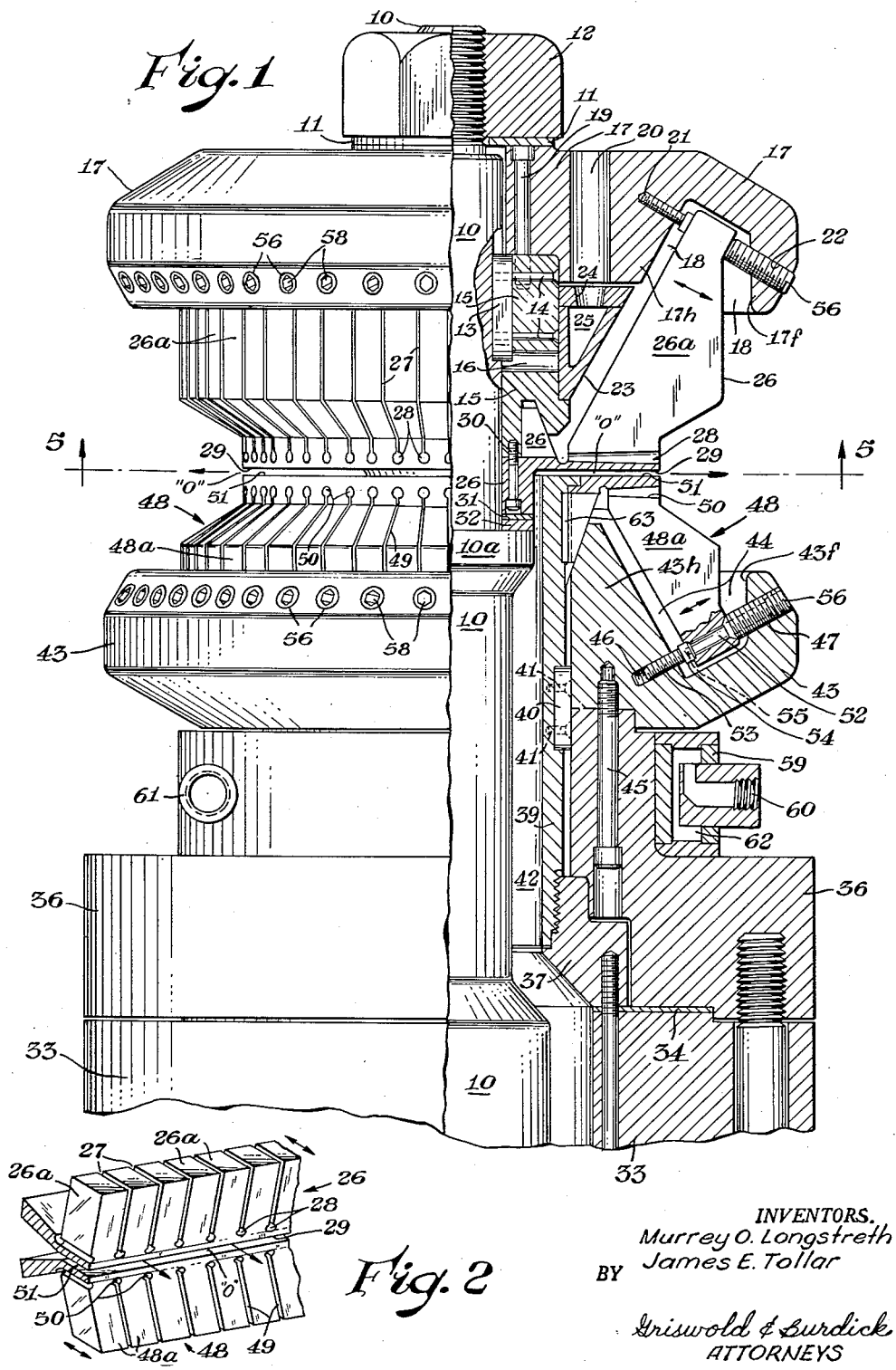

There is shown in assembly in Figure 1 and in sectional plan in Figure 5 an embodiment of a radial extrusion die in accordance with the present invention which may be mounted over the vertically directed outlet of an extruder or pump (not shown) for molten, thermoplastic material. The die comprises the upper and lower die members 26 and 48, respectively, which are housed and adjustably mounted in the assembly. The upper die member 26 consists essentially of an orbiculated flexible lip 29 from which a plurality of integral adjusting arms 26a project. Likewise, the lower die member 48 consists essentially of an orbiculated flexible lip 51 from which a plurality of integral adjusting arms 48a project. The die members 26 and 48 are suitably spaced to provide the flat ring-like extruding orifice O between the lands of the adjacent opposed faces of the die lips 29 and 51.

While die members in accordance with the present invention may have various configurations and embodiments, including their application as straight or linear and radial or circular extrusion orifices, it is advantageous for them to have a typical construction similar to that which is illustrated in the drawing and schematically shown more specifically in the perspective view of Figure 2. The adjusting arms 26a and 48a of the die members 26 and 48, respectively, may be in the form of fissured flanges or projections extending in a direction away from the faces of the upper and lower die lips 29 and 51, respectively, on or near to their edges. The die members are thus roughly configured in the shape of the capital letter L. As illustrated, the projecting portion of the upper die member 26 may be provided with a plurality of fissuriform slots 27 which extend almost to the die lip 29. Each of the slots 27 may terminate in an enlargement or groove 28 which extends through the depth of the flanged or projecting portion of the die member 26. The grooves 27 not only prevent the fracture or cracking through of the die member 26 but also provide greater mobility in the adjusting arms 26a. The lower die member 48 is similarly provided with slots 49 terminating in grooves 50. As mentioned, and as indicated by the bidirectional arrows throughout the drawing, the adjusting arms are adapted to be moved transversely in lever-like fashion relative to the die lips in a direction which is substantially perpendicular to the orifice formed by the die lips in order to bend the flexible die lips and regulate the extrusion clearance or orifice between the die lips.

The design of the adjusting arms should be such as will provide them with a greater bending moment or higher resistance to bending than is available in the flexible lip so that any movement of the arm results in an effective bending of the portion of the lip from which the arm projects. In addition, each of the adjusting arms should have a depth at its base which is almost commensurate with the width of the flexible die lip so that the juncture between the lip and adjusting arm practically spans the land which is provided by the lip. This insures that the land will not be improperly distorted during adjustment and that an effective orifice is maintained for proper extrusion at any desired clearance. As is shown cross-sectionally in Figure 1, the upper surface of the die lip may be scored or grooved near the juncture with the adjusting arm to facilitate the proper and effective bending of the lip.

Advantageously, the projecting angle of the adjusting arms and their projected length from the die lip is a matter both of convenience and of the desired or suitable leverage or mechanical advantage to be obtained for purposes of die adjustment. As is apparent, the adjusting arms may be as wide (in a direction parallel to the length of the orifice) as desired or as narrow as will permit accommodation of the associated adjusting and positioning means for the arms. A greater number of adjusting arms on a die lip of given length permits finer and more accurate adjustment of the die to be achieved.

The orbiculated die members of the embodiment of radial die illustrated in Figure 1, as shown independent of the assembly in Figures 3 and 4, advantageously have a hollow conical (or partly conical) circumferential flange or projection portion which is fissured, somewhat in the manner of a castle nut, to form integral adjusting arms. Such a frusto-conical, or crown-like arrangement advantageously is facilitative of an extremely fine and precise adjustment of the die lip in which many effective adjusting points can be utilized. The tapered adjusting arms in such an embodiment of the die members are adapted to accommodate a greater number of adjusting and positioning means at their free ends than could be directly located on a flat, ring-like die lip in which an equivalent number of points of fine adjustment might be desired.

The circular radial die members 26 and 48 are mounted spaced in the assembly shown in Figures 1 and 5 with a suitable orifice clearance between the faces of the land-providing lips 29 and 51 for extrusion of the molten thermoplastic material into a sheet having a desired thickness. The upper die member 26 is supported about a central support or stud 10 which is provided with a circumferential boss or shoulder 10s for positioning the die member which is held by means of screws 30 to an adjusting block 15 mounted on the stud 10. The adjusting block 15 is rigidly fixed to the stud 10 by means of a key 13. Screws 14 fasten the adjusting block 15 to the key 13 and a hole 16 is provided through the adjusting block for access to the key. A spacer 32 and a shim (or shims) 31 are utilized to separate the upper die member 26 from the stud boss shoulder 10s to effect a general relative positioning of the upper die member 26 in the assembly for purposes of securing a desired spacing or clearance from the lower die member 48. The upper portion of the assembly is secured by nut 12 and washer 11 on the threaded upper end of the stud 10.

The lower die member 48 is mounted about a cylindrical section 39 which is axisymmetrically positioned with the stud 10 in the assembly to provide an annular space 42 for the flow of molten thermoplastic material from the extrusion pump (not shown) to the die. The cylindrical section 39 is screwed into an internally threaded nut 37 which is held abutting a supporting spool 33 by screws 38. A sealing gasket 34 prevents leakage between the nut 37 and the spool 33. The spool 33 may conveniently be an extension of the outlet from a vertically directed extruder or pump (not shown) or, if preferred, it may be an outer conduit enclosure for vertically directing the flow of molten thermoplastic material which may be fed through a side of the spool from a horizontally disposed forwarding means. The lower die member 48 is fitted about the flared and rabbeted upper end of the cylindrical section 39 and is held in place by at least one key 63. The inner surface of the cylindrical section 39 advantageously is smoothed and provided with rounded edges to facilitate the streamline flow of the molten thermoplastic material to the die.

A base block 36 is fixed to the spool 33 by means of bolts 35 which are threaded into the spool. The base block 36 encircles the cylindrical section 39 and maintains it in alignment through one or more spacer blocks or keys 40 which are held by means of screws 41 to the cylindrical member 39. The base block 36 also supports part of the adjusting means in the assembly for the lower die member 48.

Each of the die members 26 and 48 is adjusted by means of and against fixed reaction rings which have circumferential or annular grooves or cavities for receiving and accommodating the extending adjusting arms of the orbiculated die members. The adjusting arms 26a of the upper die member 26 extend into an annular cavity 18 of an upper reaction ring 17 which has a circular, dish-like configuration. The cavity 18 separates the upper reaction ring 17 into an inner hub portion 17h and an outer circumferential flange or ridge portion 17f. The upper reaction ring is mounted on the stud 10 through bolts 19 threaded to the adjusting block 15. The adjusting arms 48a of the lower die member 48 extend into an annular cavity 44 in the lower, circular, dish-like reaction ring 43. The cavity 44 similarly separates the lower reaction ring 43 into an inner hub portion 43h and an outer circumferential flange portion 43f. The lower reaction ring 43 is mounted on the base block 36 and is maintained in a rigidly fixed connection by means of the bolts 35 extending through the base block and threaded into the reaction ring. Movement of the adjusting arms in order to adjust the clearance which is available in the flat, ring-like orifice O between the die members may conveniently be accomplished by means of inner and outer set screws 53 and 56, respectively, which are threaded into the inner and outer portions of the reaction rings and contact opposite sides of each adjusting arm. Advantageously, the greatest leverage effectiveness may be obtained and any possibility of the binding of the adjusting screws 53 and 56 may be minimized or eliminated when the screws contact the adjusting arms substantially at right angles.

As is depicted in greater detail in connection with the lower die member 48 (the adjusting arm 48a of which is shown broken out partly in section) an inner set screw 53 is threaded into an inner threaded aperture 46 of the hub portion 43h of the lower reaction ring 43. The cap 54 of the inner screw 53 contacts the inner side of the adjusting arm 48a extending into the cavity 44 in the lower reaction ring 43. The screw 53, as mentioned, is advantageously arranged to project at a right angle against the adjusting arm 48a which may be slightly dished to receive the head 54 of the screw 53 in order to provide a better contact. An aperture 52 in the adjusting arm 48a permits access for an instrument or hand tool to be inserted in the head socket 55 of the screw 53 in order to turn the screw. A relatively larger diameter outer set screw 56 is threaded into an outer threaded aperture 47 in the flange portion 43f of the lower reaction ring 43. The bottom of the screw 56 contacts the outer side of the adjusting arm 48a at a right angle. The outer side of the adjusting arm 48a may also be dished for better contact with the screw 56. The outer screw 56 is hollow, having a central opening 57 which is aligned with the aperture 52 in the adjusting arm 48a to furnish complete access for the inner screw 53. A socket portion 58 in the head of the outer screw 56 facilitates movement of the screw.

The inner and outer set screws 53, 56 for adjustment of the adjusting arms 26a of the upper die member 26 are similarly provided in the upper reaction ring 17. The inner set screws 53 are threaded into a tapped aperture 21 in the hub portion 17h of the upper reaction ring. The hollow outer set screws 56 are threaded through a tapped aperture 22 in the flange portion 17f of the upper reaction ring. The adjusting arms 26a of the upper die member 26 are also provided with transverse openings (not shown) permitting instrument access to the inner set screws. Both the inner and outer set screws 53, 56 may be conventionally threaded since the mechanical advantage provided by the adjusting arms does not require the utilization of micrometer threads or those having an equivalent fine pitch in order to effect a fine adjustment of the die lip. However, in instances where an exceedingly precise adjustment is desired, it may be advantageous for the set screws 53, 56 to be provided with micrometer threads.

The upper portion of the assembly may advantageously be heated by a circumferential oil jacket 23 having an internal chamber 25 for passage of a suitable heat transfer fluid such as oil or the like which is admitted through an inlet 24 in the jacket. An aperture 20 through the upper reaction ring 17 accommodates piping connections to the oil jacket inlet 24. A similar aperture and outlet (not shown) is provided for removal of the heat transfer fluid. The lower portion of the assembly may be heated by another circumferential heating jacket 59 having an inner circulating space 60 and inlet and outlet ports 61, 62. Other heating means such as electrical resistance elements and the like may alternatively be employed, if preferred.

In operation, the die receives molten thermoplastic material through the annular space 42 between the stud 10 and the cylindrical section 39. The molten material is directed radially outwardly in a discoid plane through the horizontally disposed flat, ring-like orifice O between the faces of the spaced radial die lips 29 and 51, as illustrated by the unidirectional arrows in various of the figures in the drawing. The thickness of the extruded sheet is determined by the clearance between the upper and lower die members 26 and 48, respectively. A prescribed general clearance in the die is obtained by choice of the proper thickness of the shim or shims 31 or spacer 32 or both which separate the upper die member 26 from the stud shoulder 10s. A proper corrective profile for the extruding sheet is then obtained by adjustment of one or the other die members or both. Usually it is convenient to obtain the initial adjustment with the lower die member 48 by suitable positioning of the adjusting arms 48a through the screws 53, 56. After extrusion has commenced, final correction of the film thickness and its profile may readily be effected by adjustment of the upper die member 26 in a similar manner. Corrections on the order of as much as 50 percent in the thickness of the extruding sheet can readily be obtained by adjustment of the die members. After suitable adjustment of the die for correction of the extruding sheet has been obtained, the thickness and profile of the sheet will remain constant so long as the extrusion temperature and other extrusion conditions are not altered.

As is apparent, the adjustment of die members in accordance with the present invention is much simpler and more exact than that which is possible with conventional adjustable extruding orifices such as in those having a separate sliding front plate with locking studs for defining the orifice. In addition, there is no problem of leakage in the die members of the invention as compared to that which inures when orifice defining plates separate from the die lands are employed as in certain conventional extrusion dies.

Since certain changes and modifications can be readily entered into in the practice of the present invention without departing substantially from its intended spirit or scope, it is to be fully understood that all of the foregoing description and specification be interpreted and construed as being merely illustrative of the invention and in no sense or manner as being limiting or restrictive thereof excepting as it is set forth and defined in the appended claims.

What is claimed is:

1. A radial die for the discoplanate extrusion of organic thermoplastic sheet which comprises a spaced pair of relatively wide and land-providing orbiculated die lips, said lips being flatly disposed and positioned with a clearance between their adjacent faces to form a deep, flat, ring-like shaping orifice; at least one of said die-lips being flexible and transversely bendable in a radial direction substantially perpendicular to said ring-like orifice; a circumferential flange near the extruding edge of said flexible die lip and projecting away from the face of said lip; a plurality of fissuriform slots extending downwardly in said flange towards said lip providing an adjacent plurality of lever-like adjusting arms on said lip; each of said arms adapted to being moved to bend the portion of the flexible lip from which it projects; a plurality of unitary means for independently positioning each of said projecting adjusting arms; and associated means for directing a flow of thermoplastic material for radial, omnidirectional extrusion through said die lips.

2. A radial die for the discoplanate extrusion of organic thermoplastic sheet which comprises a spaced pair of relatively wide and a plurality of unitary land-providing orbiculated die lips, said lips being flatly disposed and positioned with a clearance between their adjacent faces to form a deep, flat, ring-like shaping orifice; at least one of said die lips being flexible and transversely bendable in a radial direction substantially perpendicular to said ring-like orifice; a circumferential flange near the extruding edge of said flexible die lip and projecting away from the face of said lip, a plurality of fissuriform slots extending downwardly in said flange towards said lip providing an adjacent plurality of lever-like adjusting arms on said lip; each of said arms adapted to being moved to bend the portion of the flexible lip from which it projects; a circular reaction ring member having an annular cavity in which the ends of the projecting adjusting arms extend; a plurality of unitary means on said reaction ring member for independently positioning each of said projecting adjusting arms; and associated means for directing a flow of thermoplastic material for radial omnidirectional extrusion through said die lips.

3. A die in accordance with claim 2 wherein the circumferential flange which is slotted to provide said adjusting arms has a hollow, frusto-conical configuration.

4. A die in accordance with claim 3 wherein the projecting adjusting arms have a greater resistance to bending than the flexible die lip.

5. A die in accordance with claim 3 wherein the projecting adjusting arms have a greater resistance to bending than the flexible die lip and wherein the depth of each arm at its juncture with the lip is almost commensurate with the land provided by the flexible lip.

6. A die in accordance with claim 2 wherein the means on said reaction ring member for independently positioning each of said projecting adjusting arms are screw means which are threaded into said reaction ring and contact the sides of said adjusting arm extending into said annular cavity in said reaction ring.

7. A die in accordance with claim 6 wherein said screw means contact said adjusting arms substantially at right angles.

8. A die in accordance with claim 2 wherein both of the die lips are flexible and transversely bendable and are provided with slotted circumferential flanges forming adjusting arms.

References Cited in the file of this patent

UNITED STATES PATENTS

| | | |
|---|---|---|
| 2,387,718 | Coleman | Oct. 30, 1945 |
| 2,686,931 | Knox | Aug. 24, 1954 |
| 2,718,661 | Russell | Sept. 27, 1955 |
| 2,753,596 | Bailey | July 10, 1956 |
| 2,765,492 | Velvel | Oct. 9, 1956 |
| 2,769,200 | Longstreth et al. | Nov. 6, 1956 |

FOREIGN PATENTS

| | | |
|---|---|---|
| 153,610 | Australia | Oct. 13, 1953 |

UNITED STATES PATENT OFFICE
CERTIFICATE OF CORRECTION

Patent No. 2,963,741                        December 13, 1960

Murrey O. Longstreth et al.

It is hereby certified that error appears in the above numbered patent requiring correction and that the said Letters Patent should read as corrected below.

Column 6, line 23, after "and" insert -- substantially parallel --; line 42, for "a plurality of unitary" read -- substantially parallel --.

Signed and sealed this 5th day of December 1961.

(SEAL)
Attest:

ERNEST W. SWIDER
Attesting Officer

DAVID L. LADD
Commissioner of Patents
USCOMM-DC